United States Patent
Gardiner

(10) Patent No.: US 11,703,736 B2
(45) Date of Patent: Jul. 18, 2023

(54) OPTICAL FILTER MATERIALS AND DEVICES

(71) Applicant: Optomel Limited, Southampton (GB)

(72) Inventor: Damian Gardiner, Southampton (GB)

(73) Assignee: Optomel Limited, Southampton (GB)

(*) Notice: Subject to any disclaimer, the term of this patent is extended or adjusted under 35 U.S.C. 154(b) by 0 days.

(21) Appl. No.: 17/422,103

(22) PCT Filed: Jan. 9, 2020

(86) PCT No.: PCT/GB2020/050039
§ 371 (c)(1),
(2) Date: Jul. 9, 2021

(87) PCT Pub. No.: WO2020/144479
PCT Pub. Date: Jul. 16, 2020

(65) Prior Publication Data
US 2022/0113602 A1    Apr. 14, 2022

(30) Foreign Application Priority Data

Jan. 11, 2019 (GB) .................................. 1900428

(51) Int. Cl.
G02F 1/141 (2006.01)
G02B 5/28 (2006.01)
(Continued)

(52) U.S. Cl.
CPC ............ *G02F 1/141* (2013.01); *G02B 5/287* (2013.01); *G02B 5/3016* (2013.01); *G02F 1/135* (2013.01); *G02F 1/136* (2013.01)

(58) Field of Classification Search
CPC .......... G02F 1/141; G02F 1/135; G02F 1/136; G02B 5/287; G02B 56/3016
See application file for complete search history.

(56) References Cited

U.S. PATENT DOCUMENTS 3,679,290 A    7/1972    Adams et al.
5,863,457 A    1/1999    Hasebe et al.
(Continued)

FOREIGN PATENT DOCUMENTS

EP    0634674 A2    1/1995
JP    S6143702 A    3/1986
(Continued)

OTHER PUBLICATIONS

West, J. L. "The Challenge of New Applications to Liquid Crystal Displays", Liquid Crystals in Complex Geometries, XP002041494, Jan. 1, 1996, pp. 255-264. (Year: 1996).*
(Continued)

*Primary Examiner* — Nathanael R Briggs
(74) *Attorney, Agent, or Firm* — Suiter Swantz pc llo

(57) ABSTRACT

A method of aligning a chiral nematic liquid crystal (103), the method comprising depositing a first chiral nematic liquid crystal (103) onto a first substrate (102), positioning a second substrate (104) on top of the liquid crystal (103) to form an initial layer structure and then applying rolling pressure to at least one of the substrates (102, 104) of the initial layer structure to create a final layer structure in which the first chiral nematic liquid crystal (103) is aligned with a helical axis substantially perpendicular to a local plane of the first substrate (102). Aspects of the invention provide optical filter materials for laser protection applications, LED emission filtering and lighting, augmented reality display coatings.

20 Claims, 9 Drawing Sheets

(51) Int. Cl.
 G02B 5/30 (2006.01)
 G02F 1/135 (2006.01)
 G02F 1/136 (2006.01)

(56) References Cited

U.S. PATENT DOCUMENTS

| | | |
|---|---|---|
| 6,773,766 B2 | 8/2004 | Meyer et al. |
| 9,645,414 B2 | 5/2017 | Perricone et al. |
| 9,739,916 B2 | 8/2017 | Weber et al. |
| 9,857,586 B2 | 1/2018 | Shimatani et al. |
| 2005/0007531 A1 | 1/2005 | Okada et al. |

FOREIGN PATENT DOCUMENTS

| | | |
|---|---|---|
| WO | 2008138512 A2 | 11/2008 |
| WO | 2017163060 A1 | 9/2017 |

OTHER PUBLICATIONS

International Search Report and Written Opinion dated Apr. 17, 2020 for PCT/GB2020/050039.
West, J.L., "The Challenge of New Applications to Liquid Crystal Displays", Liquid Crystals in Complex Geometries, Jan. 1, 1996, pp. 255-254.
Xiao J. et al., "New Micro-Structure Designs of a Wide Band Reflective Polarizer with a Pitch Gradient", Liquid Crystals, Taylor & Francis, GB, vol. 34, No. 4, Apr. 1, 2007, pp. 473-477.

* cited by examiner

OPTICAL FILTER MATERIALS AND DEVICES

FIELD OF INVENTION

The present invention relates to the production of optical filter materials and devices based upon these materials. The devices are particularly useful for applications in laser protection, augmented and virtual reality displays, LED lighting as well as general purpose optical filter applications.

BACKGROUND

Generally speaking, optical filters form an important component of many optical systems comprising light sources and optical detectors. Optical filters are generally categorised into absorbing filters—whereby the optical characteristics (e.g. wavelengths absorbed/transmitted) are controlled by the electronic and molecular characteristics of the absorbing species—and interference-like, whereby the optical characteristics are determined by the constructive and interference of light incident on the filter. Interference-like filters require precise sequential deposition of many dielectric layers e.g. metal oxides, with each layer typically of the order of 100 nm thickness with high and low refractive index materials, on top of one another to generate the selective reflection effect. The deposition must be typically performed in a vacuum environment.

Absorbing filters are typically very low cost and can be produced on large areas and on flexible substrates, but the optical characteristics cannot be arbitrarily controlled. Interference-like filters allow precise control of the optical characteristics—such as the transmission of light at specific wavelengths—but are typically very expensive due to the vacuum deposition process required. This also limits the physical size, since the active area or platen size is constrained by the overall machine size, and type of substrate—typically glass or similar inflexible materials. Because of this process such filters are difficult to produce economically at scale.

It is an object of the present invention to provide optical filter materials which allow the reflected wavelengths to be precisely and accurately controlled, and the transmission intensity, of light required for certain applications; but which can be made on larger areas, with a wider variety of substrates, including flexible and conformable substrates, yet can be cost-effectively produced at large volumes.

It is known that liquid crystal materials, and cholesteric (also known as chiral nematic) liquid crystals, can be used to make optical filter materials using the fundamental principle of selective reflection of light property of these materials. For example, U.S. Pat. No. 3,679,290A discloses an optical notch filter comprising at least two matched pairs of cholesteric liquid crystals to reflect certain wavelengths of the electromagnetic spectrum.

U.S. Pat. No. 6,773,766B2 discloses a polymerizable liquid crystal composition that, using solvents and elevated temperatures to subsequently remove such solvents, creates solid liquid crystal films for optical components that can be processed at large scale.

WO2008138512 discloses application of a liquid crystal layer from a solution on a carrier substrate which has a layer of a thermoplastic material that is soluble in the liquid crystal material, followed by evaporation of solvent to leave the liquid crystal layer on the substrate. A stamping tool is used to align at least part of the liquid crystal in the layer and the liquid crystal material in the layer is cross-linked to fix the orientation of the molecules.

U.S. Pat. No. 9,857,586B2 discloses a display reflection device including red, green and blue wavelength selectively reflecting elements comprising cholesteric liquid crystals.

US20050007531 discloses a liquid crystal light modulation element for performing light modulation by utilizing a focal conic state of liquid crystal molecules in a layer having a plurality of liquid crystal domains and held between a pair of substrates. The layer is formed by vacuum-filling liquid crystal material into a space between the two substrates.

Laser protection optical filters are used to protect both human eyes and optical sensors from laser radiation, including from the risk of permanent damage or from the risk of dazzling or distraction. Patent Application WO2017163060A1 discloses a method to create conformable laser protection films by using interference of coherent light to form notch filters within a photosensitive film.

U.S. Pat. No. 9,645,414B2 discloses vacuum coated interference filters coated on laser protection personal eyewear such as eyeglasses to confer protection at common laser wavelengths of 445 nm, 532 nm and 610 nm.

However, the methods described use complex and expensive processing, especially for large areas. An objective of the current invention is to provide large-area laser protection filters to address this problem, avoiding the need for vacuum deposition interference, or holographically formed, filters.

The general objective of the present invention is to provide a method for simple processing of cholesteric materials to also create general purpose optical filter materials using simple processing, without the use of solvents, with fully customisable optical properties that can be cost-effectively produced on a large scale. A further objective of the present invention is to provide devices comprising optical filter materials made by this method.

SUMMARY OF THE INVENTION

According to a first aspect of the invention, there is provided a method of aligning a chiral nematic, or cholesteric, liquid crystal, the method comprising deposition of the liquid crystal onto a substrate, positioning a further substrate on top of the liquid crystal and then applying uniform rolling pressure from at least one side, to create an aligned liquid crystal film with the helical axis of the liquid crystal substantially perpendicular to the substrate.

A further aspect of the invention is: a method of aligning a chiral nematic liquid crystal, the method comprising depositing a first chiral nematic liquid crystal onto a first substrate, positioning a second substrate on top of the liquid crystal to form an initial layer structure and then applying pressure to at least one of the substrates of the initial layer structure to create a final layer structure in which the first chiral nematic liquid crystal is aligned with a helical axis substantially perpendicular to a local plane of the first substrate.

Surprisingly, the invention overcomes many of the disadvantages of typical processing of such liquid crystal materials in that use of solvents or elevated temperatures are not required. Such a material may then be used as an optical filter.

The invention provides much simpler processing than prior art methods, since the substrates are not first required to be arranged and separated to a well-defined and controlled thickness (effectively giving a pre-assembled structure) before the liquid crystal is added. Furthermore, adding the liquid crystal after the substrates have been assembled and separated also requires the use of vacuum assisting processes, for example as described in US20050007531.

According to a further aspect of the invention there is provided a method of making an optical filter, the method comprising formulating a photo-polymerizable liquid crystal composition, formulated to have a pre-determined helical pitch to reflect a specific wavelength range, and adding an amount of the formulation to a substrate; a second substrate is then added on top such that the liquid crystal is sandwiched between the two substrates, all of which is then subject to uniform rolling pressure and subsequent UV curing from one or both sides. The UV curing—or UV photo-induced polymerization—creates a polymerized liquid crystal layer. Preferably, the substrate is peeled away to leave an aligned layer of polymerized liquid crystal acting as an optical filter, with optional further processing directly on top.

A further aspect of the invention is a method of manufacturing an optical filter, the method comprising the steps of:

a) depositing a chiral nematic liquid crystal containing photopolymerisable moieties onto a first substrate,
b) positioning a second substrate on top of the chiral nematic liquid crystal,
c) applying rolling pressure to at least one of the substrates to create a layer structure in which the chiral nematic liquid crystal is aligned with a helical axis substantially perpendicular to a local plane of a substrate;
d) subjecting the layer structure to UV or visible light to produce a layer of photopolymerised chiral nematic liquid crystal,
e) removing one of the substrates to expose a surface of photopolymerised liquid crystal,
f) depositing a chiral nematic liquid crystal selected to form a helical structure of the same or opposite handedness to the helical structure of the photopolymerised chiral nematic liquid crystal and containing photopolymerisable moieties onto the exposed surface of the photopolymerised chiral nematic liquid crystal,
g) positioning a substrate on top of the chiral nematic liquid crystal,
h) applying rolling pressure to at least one of the substrates to create a layer structure in which the chiral nematic liquid crystal is aligned with a helical axis substantially parallel to the helical axis of the photopolymerised chiral nematic liquid crystal,
i) subjecting the layer structure to UV or visible light to photopolymerise the chiral nematic liquid crystal;
and optionally
j) repeating steps e) to i) one or more times.

It is preferable that the distance, or separation, between the point of contact of the means producing the uniform rolling pressure and a second point of contact (such as a plane surface or another means of producing rolling pressure), positioned at the opposite side of the substrate-liquid crystal-substrate composite is equal to or less than the combined thickness of the substrate-liquid crystal-substrate composite. The separation of the points of contact may be of similar size to the thickness of both substrates, or less, in which case the substrates will also compress during the application of rolling pressure. This may be of further benefit in terms of creating the correct alignment and layer thickness, for example. A further aspect of the invention, wherein the rollers are separated by a gap which is less than the thickness of the initial layer structure but greater than the combined thickness of the first substrate and the second substrate.

A further aspect of the invention is that additional layers or substrates, such as polymer layers, may be inserted in between the points of contact of the rollers and the substrates to protect the substrates from the processing, or to act as a spacer or to allow extra pressure to be applied for a specific roller separation distance, for example.

A further aspect of the invention is that a further photo-polymerizable composition, of the opposite chiral sense, or handedness, to the first composition, is then added on top of a polymerized liquid crystal layer; a further substrate is then added on top such that the liquid crystal is sandwiched between the two substrates, all of which is then subject to uniform rolling pressure and subsequent UV curing. One substrate is then peeled away to leave a solid film of substantially aligned polymerized liquid crystal comprising two layers.

Preferably, the deposition, addition or otherwise provision of the liquid crystal material to the substrate takes place by suitable means of applying a controlled amount of material, including printing methods such as slot-die coating, wire bar coating, patterned rollers, screen printing, pad printing, or inkjet deposition.

Preferably, the thickness of each layer is controlled to allow the transmission level, within the reflected wavelength range—or ranges—of the filter to be controlled with respect to a pre-determined and application specific range.

Preferentially, the reflection bands of multiple layers of formulations may substantially coincide, to increase the reflective effect or to ensure uniformity across the filter so that the filtering effect is substantially the same across a filter.

Preferentially, the reflection bands of multiple layers may differ from each other in a pre-determined way to control the level of transmission within the filter, or to provide a certain spectral profile of the filter for a specific requirement.

Further photo-polymerizable compositions may then be added on top and the process repeated to build up a multi-layered structure comprising left and right chiral handed polymerized liquid crystals. Materials of similar handedness may be processed sequentially (e.g. right-hand, right-hand, etc or left-hand, left-hand) or alternate handedness (e.g. right-hand, left-hand, right-hand, left-hand). According to a further aspect of the invention, materials of different pitch lengths but the same handedness may also be processed sequentially.

Preferentially, layers reflecting different ranges may be additively processed on top of one another, for example to have a composite filter comprising reflective filters in the Red, Green or Blue wavelength ranges—or any other combination in the ultraviolet, visible and infra-red ranges, for example.

Preferentially, the substrates are pre-treated to promote parallel anchoring—where the molecular long axis is substantially parallel to the substrate—of the liquid crystal. For chiral nematic, or cholesteric, liquid crystals this results in the helical axis being oriented substantially perpendicular to the substrate. An example of a pre-treatment would be a coating of polyvinylalcohol or polyimide alignment layer. One or both substrates may be treated in this way.

Preferentially, the surface pre-treatment, to promote parallel anchoring of the liquid crystal consists of a coating such as polyvinyl alcohol, polyimide—well known in the art as alignment agents for this purpose—or a treatment such as a toner receptive coating which may also promote the same alignment of the liquid crystal.

Preferably, the substrates are not rubbed, that is not mechanically treated to create a preferential axis of alignment of the liquid crystal. In some cases, substrates comprising a surface pre-treatment may be mechanically rubbed to create micro-grooves to further aid in preferential alignment of the liquid crystal.

Preferably, one or both substrates may be coated with a release agent, such as polyvinyl alcohol, to promote preferential release of a substrate from a prepared liquid crystal film.

The substrates typically comprise polymers, such as Polyethylene terephthalate (PET), available under tradenames such as Melinex or Mylar, polypropylene, or polycarbonate, available under the tradename Lexan, for example. The polymer may be a thermoplastic or thermoformable, allowing filters to be adhered conformally to a complex surface. Other conventional substrates may be used, such as glass or plastic, for example. Non-transparent substrates may also be used.

The substrates may also comprise an indium tin oxide (ITO) or some other substantially transparent conductive coating to allow electric addressing, or switching, of the liquid crystal by an external applied electric field. This would allow the transmission and optical characteristics of the filter to be changed in a controlled way, or turned on or off, for example.

The materials comprising the formulation preferentially include cholesteric or chiral nematic materials. In these materials, the constituents typically are rod shaped molecules which adopt a locally preferred direction, termed the liquid crystal director. They are typically birefringent materials in that the refractive index measured along the molecular long axis is significantly larger than the refractive index measured perpendicular to the molecular long axis.

By virtue of the molecular structure, or presence of other additives, macroscopically the materials may form a helicoidal structure in which the director rotates through space. The distance taken for a complete rotation of the director is termed the pitch of the liquid crystal. Owing to the birefringent properties of the material, this rotation creates a periodic variation of the refractive index, which, owing to Bragg-like scattering of light creates a photonic reflection band for light of wavelengths approximately equal to the product of the pitch multiplied by the average refractive index. The bandwidth of the reflection band is approximately given by the product of the pitch multiplied by the birefringence (i.e. the difference in the parallel and perpendicular refractive indices).

The materials may contain other additives, such as optically absorbing species—including organic or inorganic dyes—in order to modify the optical properties in a controlled way. These are typically added at a low concentration, less than 10% by weight. Dyes may include dichroic properties and align preferentially with the liquid crystal director.

From the helicoidal structure, the cholesteric, or chiral nematic, liquid crystals are chiral in that they exist in right and left-handed forms attributable to the rotation of the director through space. With a sufficient number of helical pitches, around 8 to 10 repetitions, a layer typically reflects 50% of the incident light corresponding to the same circular polarization sense. This occurs for light incident substantially parallel to the helical axis. Theoretically, to achieve 100% reflection requires two layers, comprising identical materials in terms of pitch and birefringence but with the opposite chirality e.g. a filter reflecting 100% would need both left and right handed forms of the same material. Practically, however, due to inhomogeneities in processing and formation of the layers, multiple such layers comprising alternating left and right-handed materials are required to achieve high extinction with the reflection notch.

Preferably the invention can be used to create reflective notch filters anywhere in the UV, visible, and near infra-red ranges. In particular, the range between 300 nm to 1000 nm, with a controllable transmission level from 10% to close to 100% reflection within a reflective region defined by the filter.

Preferably, other filter types—such as band-pass, long-pass and short-pass can be created according to the invention by layering individual notch filters together.

The invention is particularly suitable for creating large area reflective filters providing a high degree of optical customization traditionally provided by interference filters but with less complex and lower cost processing at scale than such filters.

The invention is particularly suitable for creating filters for laser protection applications. In this case, the filter is designed to reflect light of a pre-determined range. For example, a filter substantially blocking light at 532 nm is practically useful since cheap laser pointers are mass produced at this wavelength. Preferentially, multiple layers, comprising alternative layers of right- and left-handed chiral materials are required within the same filter to achieve a high level of extinction around 532 nm.

Preferably, for laser protection applications the minimum filter transmission within reflective notch filter is less than 10%, most preferably much less than 1%.

The invention is also suitable for creating filters wherein the filtering effect varies in a controlled, spatially varying way within the filter. For example, where the reflective notch filter varies as a function of distance in the plane parallel to the substrate. This may be achieved by depositing two chiral nematic liquid crystals, each with a different value of the pitch, and allowing both mixtures to diffuse thereby inducing a pitch variation which can be subsequently fixed, for example, by the use of UV induced photopolymerization in photopolymerizable chiral nematic liquid crystal materials.

Preferentially, a laser protection filter providing substantial extinction at multiple wavelengths, for example 532 nm, 445 nm or 610 nm, can be provided with the present invention. The filter would possess high optical transmission, outside of these reflection bands, particularly in the visible spectrum for humans—or alternatively, where electro-optic sensors are being protected, allow useful operation of those sensors outside of the wavelength band being reflected.

Preferably, a filter made by the present invention can be provided on a transparent, adhesive-backed polymer to allow simple and inexpensive retrofitting to another optical component, eyeglasses including aircraft, transportation or building windows, or military vehicles for example.

In some embodiments of the invention, it may be beneficial to modify a filter made by the present invention, for example, to improve ruggedness and stability, by adding further layers (e.g. encapsulation layers) on top of the liquid crystal filter layer. Such layers could be added by coating methods well-known in the art.

The invention is also suitable for creating large-area reflective display screens for augmented reality applications, whereby images are overlaid on a viewer's interpretation of a physical scene. Preferentially, the filter has reflective properties matched to an image projection source, such that the images projected by the source are reflected towards a viewer whilst substantially allow other wavelengths from the physical scene to pass through the filter. Such display screens are useful for advertising applications or in retail to aid in promotion of consumer products or customer information. In a further preferred embodiment it is desirable to match the polarization sense of the projected image light (for example, left or right circularly polarized) to the sense of polarization reflected by the filter layer (for example, left or right circular polarizations) to achieve a greater contrast whilst still allow light of the same wavelength to be transmitted through the transparent display screen from the external physical scene.

The invention could also be applied as a contrast enhancement filters in so-called (whether head-mounted in the form of eyeglasses or otherwise) augmented reality display systems, in which a projected image is overlaid on a physical scene. Preferably the filter prepared by the invention substantially matches, in terms of the wavelengths reflected, the wavelengths used in the display system. For example, the wavelengths comprising the projected image used in such systems. When positioned before the means used to transfer the image to a viewer's eye (e.g. waveguide or reflector), it effectively pre-filters the light by removing similar wavelengths to those comprising the projected image from the physical scene. The layer will then significantly enhance the contrast of the image perceived by the viewer with respect to a physical scene allowing higher clarity images than would be typically possible.

The invention is also suitable for point-of-care diagnostics applications. Many such applications use the approach of exciting a fluorophore, using an LED or laser source, to determine whether a target molecular species, is present or not. Optical filters are an essential component, alongside the excitation source and detector. It is preferable to match the filter to both the fluorophore and excitation source spectral profiles.

The invention is also particularly suitable for lighting applications. For example, it may be desirable from an aesthetic, human factors, or functional perspective, to remove portions of the spectrum of light used to substantially illuminate a physical space, for example in the home, workplace, industrial, manufacturing, horticultural and livestock environments. It may also be used to modify the color temperature, color rendering index of a white light LED for functional, well-being and aesthetic benefit. The invention thus describes a method to create different kinds of optical filters using liquid crystal materials for use in various applications.

DETAILED DESCRIPTION OF THE INVENTION AND DRAWINGS

The invention will now be described in more detail with specific examples and reference to the above Figures and Drawings.

To usefully exploit chiral nematic or cholesteric liquid crystals as optical filter materials it is necessary to control and ensure that the liquid crystal is aligned in the correct fashion. This is because the optical filtering effect uses the fundamental property of selective reflection of light by these materials. The selective reflection of light normal to the substrate surface also allows confirmation that the chiral nematic liquid crystal is oriented in the preferred manner; that is with the molecular long-axes substantially aligned in the plane parallel to the substrate and the helicoidal axis aligned perpendicular to this direction. If oriented in this way, the selective reflection of light is readily observed experimentally with distinct spectral characteristics. To measure this property, a fibre optic white light source (AIS Inc. DT1000) and Ocean Optics fibre optic Spectrometer (USB2000) are collinearly arranged on optical mounts allowing measurement of the light transmission through a sample. With this preferred alignment the sample also exhibits a pronounced colour shift—in that the selective reflection colour shifts towards shorter wavelengths when viewed at oblique angles from the surface normal.

The invention is briefly exemplified below with specific examples of the processing according to the invention and implementation into specific devices and applications.

Example 1

A sample of 2.69% w/w R-5011, a chiral additive known to induce the chiral nematic phase in achiral nematic liquid crystals (Jiangsu Hecheng Display Technology Co. Ltd), was added to the achiral commercial nematic mixture BL006 (Merck GmBH) and was allowed to mix for 15 minutes in the isotropic phase with mechanical mixing at a temperature of 130 degrees Celsius. The resultant mixture demonstrated the chiral nematic phase at room temperature with a chiral nematic pitch of approximately 350 nm.

This particular host material, BL006, is known in the art as a material suitable for switching its optical state through dielectric coupling to an applied electric field.

A quantity (0.1 g) of the mixture was added to an uncoated biaxially-oriented polyethylene terephthalate (PET) substrate—manufactured by Dupont under the trade name Melinex—and a further identical substrate was added on top. Uniform rolling pressure from a hand-roller (see FIG. 1) was applied across the whole substrate width at room temperature—resulting in the applied mixture spreading, between the two substrates, and creating substantially parallel alignment of the chiral nematic liquid crystal. This was confirmed by the measurement of a well-defined band of selectively reflected light (see FIG. 2). The sample uniformity was good in that a similar reflection band was observed substantially throughout the sample. The sample thickness was approximately 5 microns.

Figure 1:
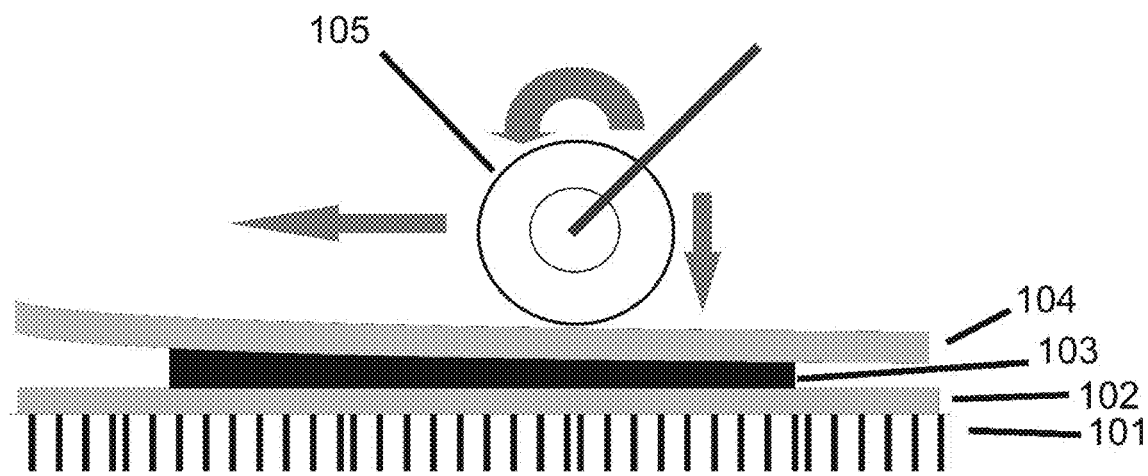
FIG. 1 shows, according to the invention, the use of a hand-roller to create an aligned chiral nematic liquid crystal layer suitable for use as an optical filter medium.

FIG. 1 therefore shows, according to the invention, the use of a hand-roller (105) positioned with downward pressure and translational rolling motion, creating continuous rolling pressure, to spread and align a chiral nematic liquid crystal (103) which is disposed between two substrates (102 and 104) positioned on a support surface (101), such as a worktop or table. The separation between the point of contact of 105 and 101, is equal to or less than the total combined thickness of 102, 103 and 104. The liquid crystal is substantially in the preferred direction of alignment, with the helical axis normal to the substrates, once the roller has passed over.

Figure 2:
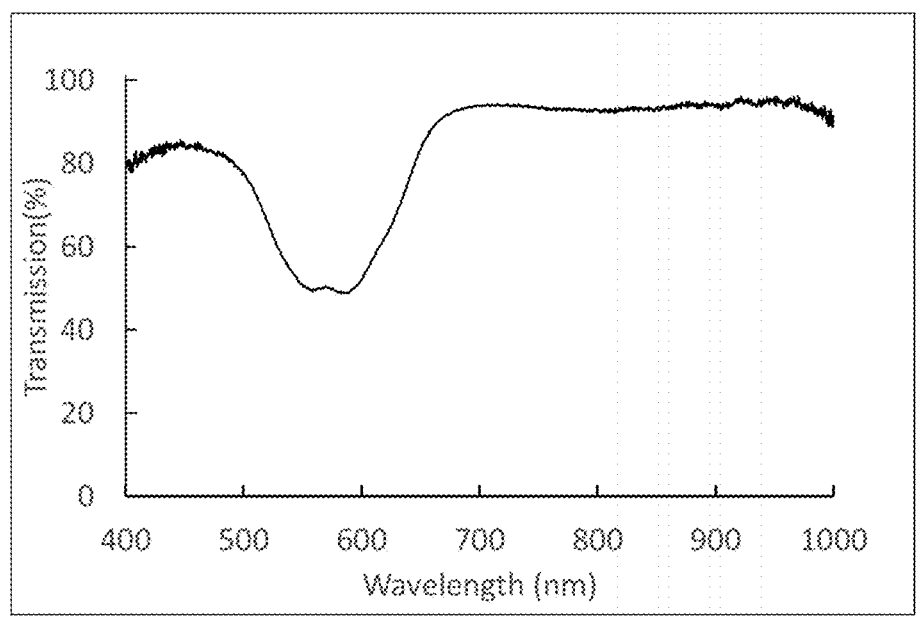
FIG. 2 shows, according to the invention, a graph of the transmission versus wavelength for an aligned layer of chiral nematic liquid crystal made according to the present invention.

FIG. 2 shows, according to the invention, a graph of the transmission versus wavelength for an aligned layer of chiral nematic liquid crystal consisting of 2.69% w/w R-5011 in the non-chiral commercial nematic mixture BL006 (Merck GmBH). Because the preferred alignment has been induced, the chiral nematic liquid crystal exhibits a pronounced dip in transmission (due to an increase in reflectivity) to around 50% at a wavelength of approximately 580 nm when measured perpendicularly to the surface.

Example 2

A quantity (0.1 g) of the same mixture (2.69% w/w R-5011 in BL006) was added to a 100 micron PET substrate coated with a 1 micron thick layer of polyvinyl alcohol. The polyvinyl alcohol layer was made by first forming a 5% w/w solution of Seksui 518 polyvinyl alcohol (partially hydrolysed, 87% to 89%) in deionised water, followed by subsequent coating onto a 100 micron Melinex PET substrate using a wire bar coating method, giving a 20 micron thick wet coating which subsequently dried to form a 1 micron dry coating. A second PVA coated substrate, prepared in the same manner, was then added on top. Uniform rolling pressure from a hand roller was applied across the whole length of the substrate, defined laterally by the width of the roller. The mixture composition, positioned between the two substrates, was substantially uniform in appearance and distributed over a larger area, compared to the pre-rolled mixture, by the action of the roller. The alignment was confirmed by observation of the selective reflection of light by the sample when viewed at normal incidence (see FIG. 3).

Figure 3:
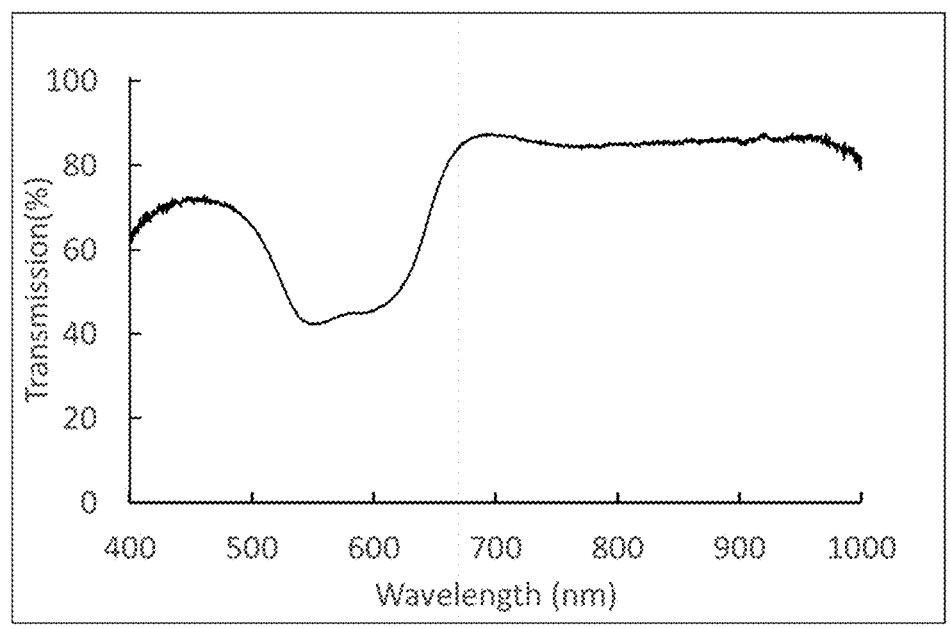
FIG. 3 shows, according to the invention, a graph of transmission versus wavelength for an aligned layer of chiral nematic liquid crystal comprising 2.69% w/w R-5011 in the non-chiral commercial nematic mixture BL006 (Merck GmBH). In this case the sample was prepared using a PVA coating on both surfaces.

FIG. 3 shows, according to the invention, a graph of transmission versus wavelength for an aligned layer of chiral nematic liquid crystal consisting of 2.69% w/w R-5011 in the non-chiral commercial nematic mixture BL006 (Merck GmBH). In this case the sample was prepared using a PVA coating on both surfaces to further promote alignment according to the invention. Because the preferred alignment has been induced, the chiral nematic liquid crystal exhibits a pronounced dip in transmission (due to an increase in reflectivity).

Example 3

A quantity (0.1 g) of the same mixture (2.69% w/w R-5011 in BL006) was added to a PET substrate coated with a 1-micron thick layer of polyvinyl alcohol prepared in the same manner. A second PVA-coated substrate, prepared in the same manner, was then added on top; all of which were then inserted into a simple lamination machine comprising two machine driven rollers (FIG. 4) applying uniform rolling pressure, at a speed of 0.5 centimetres per second, with processing at room temperature. The machine-driven rollers were of diameter 2 cm and were separated by a distance less than the combined thickness of both top and bottom substrates, PVA coatings and liquid crystal layer. The sample appearance and transmission spectrum were substantially uniform across the whole substrate width. The alignment was confirmed by observation of the selective reflection of light by the sample when viewed at normal incidence (see FIG. 5).

Figure 4:
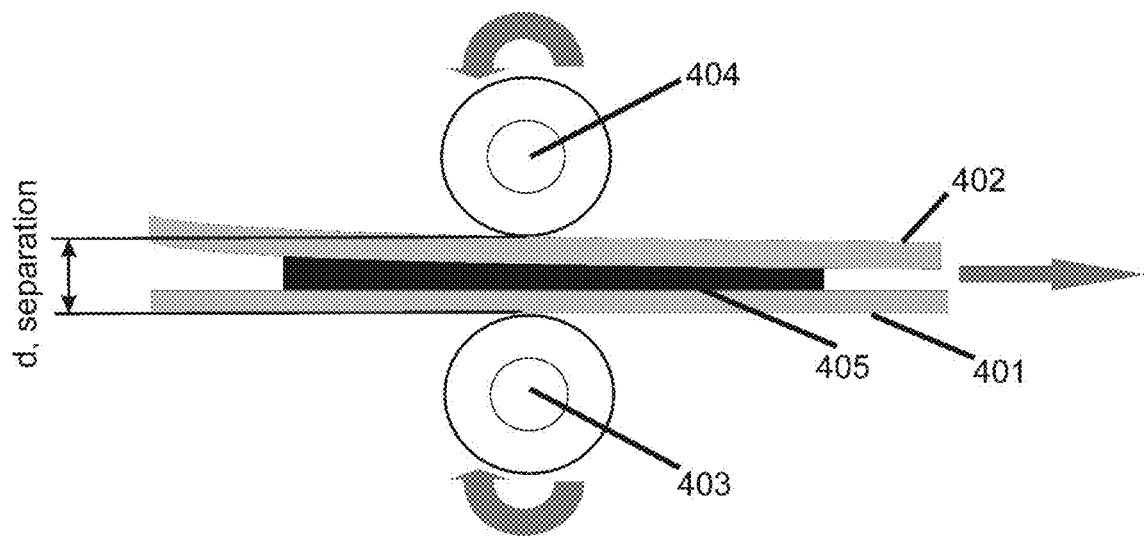
FIG. 4 shows, according to the invention, the use of two mechanical rollers separated by a distance, d, less than the combined thickness of both upper and lower substrates and coating applied to both substrates and cholesteric liquid crystal layer, to create a liquid crystal layer with the preferred alignment direction.

FIG. 4 shows, according to the invention, the use of two mechanical rollers (404 and 403) separated by a distance, d, less than the combined thickness of both upper and lower substrates (401 and 402), plus the coating applied to both substrates (not shown but typically of the order of a few microns), plus cholesteric liquid crystal layer (405), to create a liquid crystal layer, and optical filter material, with the preferred alignment direction. The direction of travel of the substrate, relative to the fixed position of the rotating rollers (404, 403) is shown. The substrates may include extra layers, to act as spacers or to increase the pressure applied or to protect the substrates from the processing. A typical separation of the rollers is approximately 200 microns, or less. The separation may be varied from this value to effect a greater degree of uniform rolling pressure on the liquid crystal material, which may be beneficial in terms of the quality of the alignment of the preferred direction.

It will be clear to one skilled in the art that the roller transverse width, and hence the width of any filter layer prepared by the invention with sufficient material present, could be of any practical length. The rollers may comprise coatings or rubber to varying the nature and amount of applied pressure or for processing convenience. The rollers may be incorporated into a roll to roll machine which includes all the steps of deposition, rolling pressure treatment, UV curing to improve throughput and processing speed and efficiency.

Figure 5:
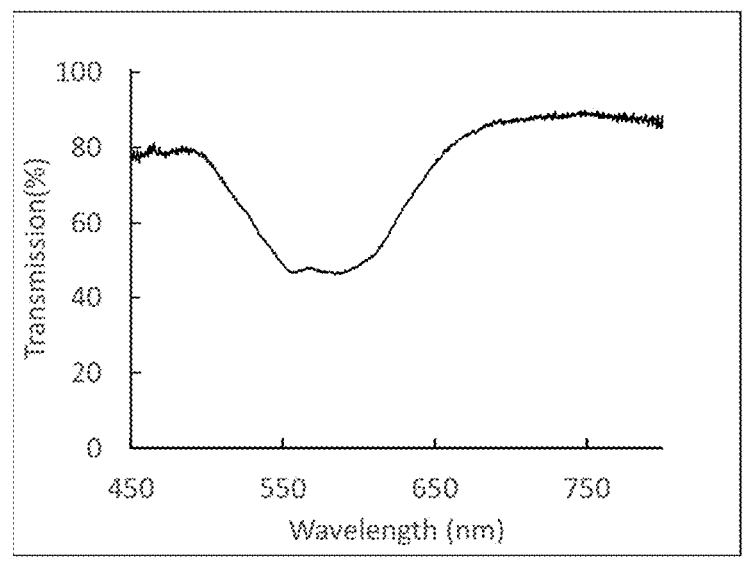
FIG. 5 shows, according to the invention, a graph of transmission versus wavelength for an aligned layer of chiral nematic liquid crystal consisting of 2.69% w/w R-5011 in the non-chiral commercial nematic mixture BL006, according to a process pictured in FIG. 4.

FIG. 5 shows, according to the invention, a graph of transmission versus wavelength for an aligned layer of chiral nematic liquid crystal chiral nematic liquid crystal consisting of 2.69% w/w R-5011 in the non-chiral commercial nematic mixture BL006, according to a process pictured in FIG. 4. Because the preferred alignment has been induced, the chiral nematic liquid crystal exhibits a pronounced dip in transmission (due to an increase in reflectivity) which is shown in the graph at approximately 570 nm.

Example 4

Liquid crystal monomers containing polymerizable components are well known in the art and are commercially available. Typically, these are liquid crystal materials that have functionalized, unsaturated reactive end-groups, such as acrylate, which can be polymerized using well-known methods, such as UV induced photo-polymerization facilitated by UV activated photoinitiator species. Such materials can used to freeze-in and ruggedize liquid crystal orientations, textures and functionalities. Examples of the types of molecular species and suitable photopolymerizable materials are given in U.S. Pat. No. 5,863,457A.

A mixture containing 1.2% w/w UV absorbing photoinitiator (Irgacure-819, BASF), chiral dopant, 2.73% w/w R-5011, diacrylate reactive mesogen 10.1% w/w RM-257 (Synthon Chemicals GmbH) and 86% w/w BL006 (Merck GmbH) was weighed and allowed to fully mix using mechanical stirring in the isotropic phase of the liquid crystal at 130 degrees Celsius for 1 hour. A quantity (0.1 g) of this mixture was added to a PET substrate coated with a 1 micron thick layer of polyvinyl alcohol (Seksui 518) prepared in the same manner as described in Example 2. A second PVA coated substrate, prepared in the same manner, was then added on top; all of which were then inserted into a simple lamination machine comprising two machine driven rollers as per Example 3, creating a sample of aligned liquid crystal material. The sample appearance and alignment were substantially uniform across the whole area covered by the liquid crystal material. The sample was then inserted into an ultraviolet curing box (Mega Electronics Pluvex) and irradiated by ultraviolet light incident on one side, at an intensity of 5 mW/cm$^2$ for 120 seconds thereby inducing photo-polymerization within the liquid crystal material. Subsequently, the sample was removed, with one substrate peeled away. The sample alignment was substantially uniform across the whole sample, with correct alignment of the liquid crystal confirmed by the measurement of selective reflection of light by the sample when viewed at normal incidence.

Example 5

A photopolymerizable mixture containing 1.7% of the left-handed chiral additive S-5011, 39.3% w/w UCL-001 (a commercially available reactive mesogen formulation including UV absorbing photoinitiator, DIC Japan), 59% UCL-008 (a commercially available reactive mesogen formulation including UV absorbing photoinitiator, DIC Japan) was made and allowed to fully mix in the isotropic phase at 110 degrees Celsius with mechanical stirring for 30 minutes. The mixture exhibited the chiral nematic phase at room temperature. A quantity (0.1 g) of the same mixture was added to a PET substrate coated with a 1 micron thick layer of polyvinyl alcohol (Seksui 518) prepared in the same manner as described above. A second PVA coated substrate, prepared in the same manner, was then added on top; all of which were then inserted into a simple lamination machine comprising two machine driven rollers (as per Example 3) applying uniform rolling pressure at a speed of 0.5 centimetres per second. The sample appearance and alignment were substantially uniform across the whole area covered by the liquid crystal material. The sample was cured in the same manner as described above at 5 mW/cm$^2$ for 120 seconds thereby inducing photo-polymerization within the liquid crystal material. Subsequently, the sample was removed, with one substrate peeled away. The sample alignment was substantially uniform across the whole sample, with correct alignment of the liquid crystal confirmed by the measurement of selective reflection of light by the sample when viewed at normal incidence (FIG. 6).

Figure 6:
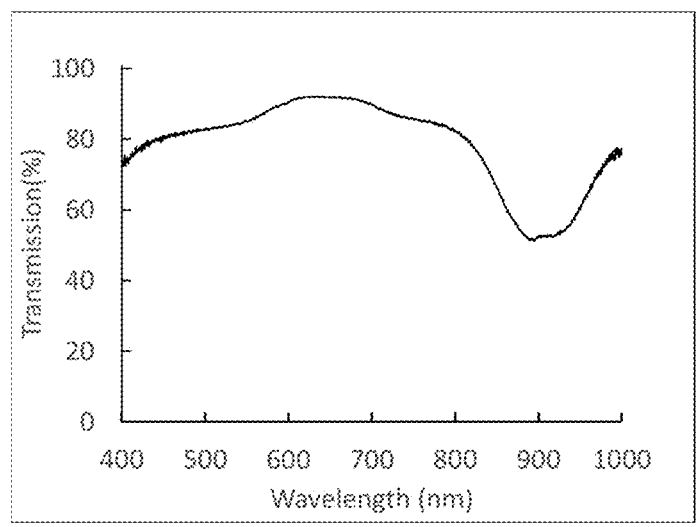
FIG. 6 shows, according to the invention, a graph of transmission versus wavelength for an aligned layer of chiral nematic liquid crystal comprising 1.7% of the left-handed chiral additive S-5011, 39.3% w/w UCL-001, 59% UCL-008 photopolymerizable mixtures.

FIG. 6 shows, according to the invention, a graph of transmission versus wavelength for an aligned layer of chiral nematic liquid crystal comprising 1.7% of the left-handed chiral additive S-5011, 39.3% w/w UCL-001, 59% UCL-008 photopolymerizable mixtures. Because the preferred alignment has been induced by the process according to the invention, the chiral nematic liquid crystal exhibits a pronounced dip in transmission (due to an increase in reflectivity) which is shown in the graph at approximately 910 nm.

Example 6

Figure 7:
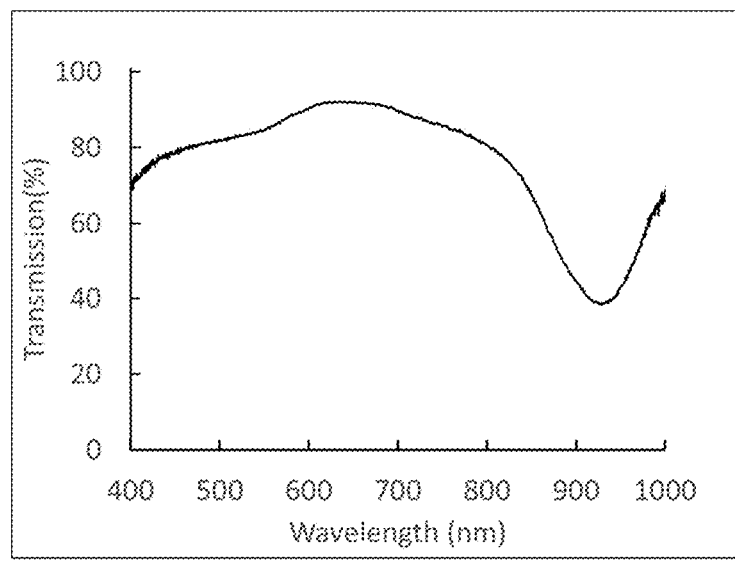
FIG. 7 shows, according to the invention, a graph of transmission versus wavelength for an aligned layer of chiral nematic liquid crystal comprising 1.7% of the right-handed chiral additive R-5011, 39.3% w/w UCL-001, 59% UCL-008 photopolymerizable mixtures.

A photopolymerizable mixture containing 1.7% of the right-handed chiral additive R-5011 (Kindchem Ltd), 39.3% w/w UCL-001 (a commercially available reactive mesogen formulation including UV absorbing photoinitiator, DIC Japan), 59% UCL-008 (a commercially available reactive mesogen formulation including UV absorbing photoinitiator, DIC Japan) was made and allowed to fully mix in the isotropic phase at 110 degrees Celsius with mechanical stirring for 30 minutes. The mixture exhibited the chiral nematic phase at room temperature. A quantity (0.1 g) of the same mixture was added to a PET substrate coated with a 1 micron thick layer of polyvinyl alcohol (Seksui 518) prepared in the same manner as described above. A second PVA coated substrate, prepared in the same manner, was then added on top; all of which were then inserted into a simple lamination machine comprising two machine driven rollers (see FIG. 4) applying uniform rolling pressure at a speed of 0.5 centimetres per second. The sample appearance and alignment were substantially uniform across the whole area covered by the liquid crystal material. The sample was cured in the same manner as described above at 5 mW/cm$^2$ for 120 seconds thereby inducing photo-polymerization within the liquid crystal material. Subsequently, one substrate was peeled away leaving the polymerized liquid crystal material adhered to the other substrate. The sample alignment was substantially uniform across the whole sample, with correct alignment of the liquid crystal confirmed by the measurement of selective reflection of light by the sample when viewed at normal incidence (FIG. 7). The sample thickness was approximately 7 microns. The peak reflection—or minimum transmission level—occurred at approximately 930 nm, slightly different to Example 5, in which the peak reflection occurred at approximately 915 nm. Slight differences in chiral dopant purity, mixture weighing error account for this which will improve if mixtures are prepared on a larger scale.

FIG. 7 shows, according to the invention, a graph of transmission versus wavelength for an aligned layer of chiral nematic liquid crystal comprising 1.7% of the right-handed chiral additive R-5011, 39.3% w/w UCL-001, 59% UCL-008 photopolymerizable mixtures. Because the preferred alignment has been induced, the chiral nematic liquid crystal exhibits a pronounced dip in transmission (due to an increase in reflectivity) which is shown in the graph at approximately 920 nm.

Example 7

In this example, a polymerized liquid crystal layer containing 1.7% of the left-handed chiral additive S-5011, 39.3% w/w UCL-001, 59% w/w UCL-008 was prepared as described in Example 5. Following removal of the top substrate, a quantity (0.1 g) of the mixture containing the opposite handedness chirality, described in Example 6 (i.e. 1.7% of the right-handed chiral additive R-5011, 39.3% w/w UCL-001, 59% w/w UCL-008) was added directly on top of the first polymerized layer. A PVA coated PET substrate was then added on top (with the PVA side facing the liquid crystal) with subsequent processing identical to Examples 5 and 6. Following removal of the top substrate, a film comprising two polymerized liquid crystal layers—but with each of the opposite chirality and twist sense—was produced. The sample alignment was substantially uniform across the whole sample, with the preferred alignment of the liquid crystal confirmed by the measurement of selective reflection of light by the sample when viewed at normal incidence (FIG. 8) centred around 910 nm approximately. The total sample thickness was approximately 14 microns. Notably the minimum transmission within the reflective notch was less than 5%.

Figure 8:
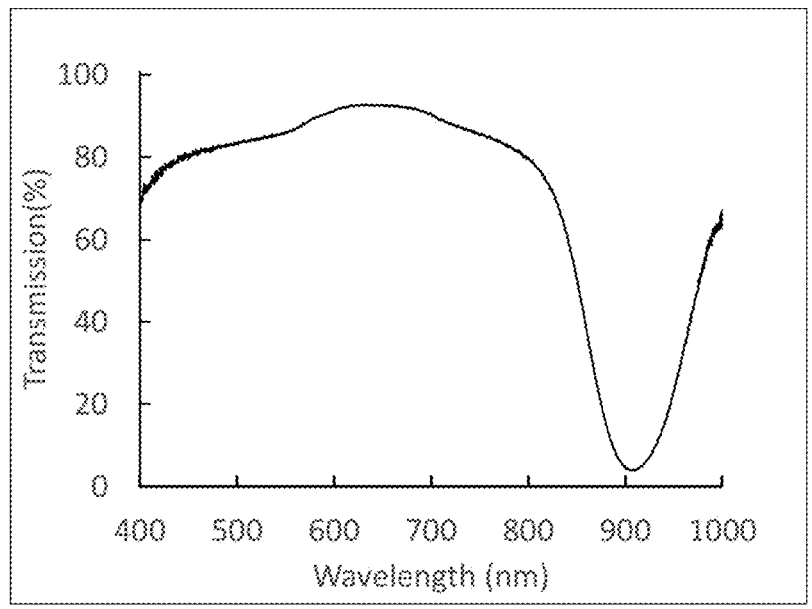
FIG. 8 shows a graph of transmission versus wavelength for a two-layer chiral nematic liquid crystal sample prepared according to the invention comprising a right-handed chiral nematic liquid crystal (1.7% of the right-handed chiral additive R-5011, 39.3% w/w UCL-001, 59% UCL-008) on top of a left-handed chiral nematic liquid crystal (1.7% of the right-handed chiral additive S-5011, 39.3% w/w UCL-001, 59% UCL-008) of substantially the same pitch.

FIG. 8 shows a graph of transmission versus wavelength for a two-layer chiral nematic liquid crystal sample prepared according to the invention comprising a right-handed chiral nematic liquid crystal on top of a left-handed chiral nematic liquid crystal of substantially the same pitch and formulation (in this case comprising either 1.7% of the right-handed chiral additive R-5011 or 1.7% of the left-handed chiral additive S-5011 with the remainder of the mixture comprising 39.3% w/w UCL-001, 59% w/w UCL-008 photopolymerizable mixtures). Because the preferred alignment has been induced, and because there are now two layers each reflecting substantially the opposite handedness of light incident on the sample filter, the chiral nematic liquid crystal exhibits a pronounced dip in transmission of around 4% (due to an increase in reflectivity) at approximately 910 nm.

Example 8

With similar processing conditions to those described in Example 7, a further example was created with the same mixtures comprising 4 layers in total, alternating between right (R-) and left-(S-) handed versions, starting with the mixture comprising the R-5011 dopant. In this way, a 4 layer structure was created possessing substantial uniformity and exhibiting the preferred alignment of the liquid crystal. The total sample thickness was around 30 microns. The transmission within the notch was less than 0.4% (FIG. 9).

Figure 9:
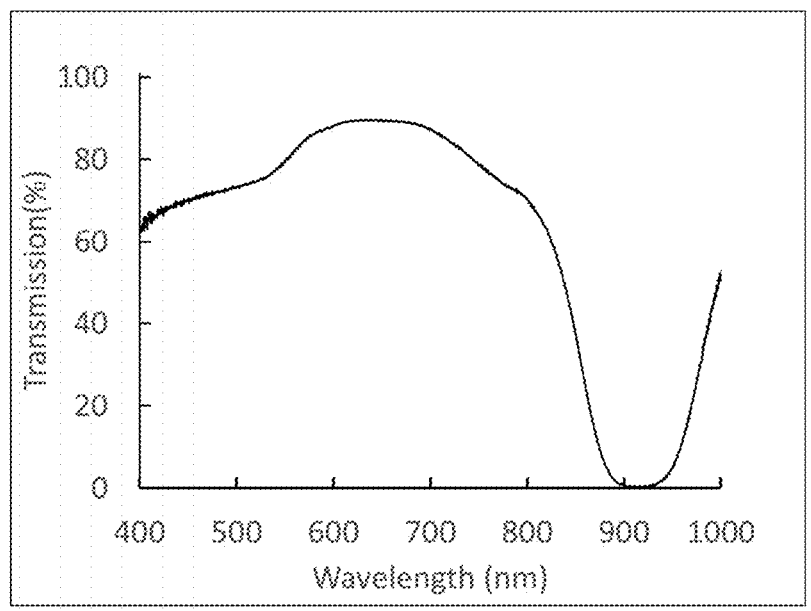
FIG. 9 shows a graph of transmission versus wavelength for a four-layer chiral nematic liquid crystal sample, prepared according to the invention, comprising 4 total layers of alternating right and left-handed chiral nematic liquid crystal materials each of substantially the same pitch (comprising either 1.7% of the right- or left-handed chiral additive R-5011/S-5011 respectively with remainder including 39.3% w/w UCL-001, 59% UCL-008).

FIG. 9 shows a graph of transmission versus wavelength for a four-layer chiral nematic liquid crystal sample, prepared according to the invention, comprising 4 total layers of alternating right and left-handed chiral nematic liquid crystal materials each of substantially the same pitch and formulation (in this case comprising either 1.7% of the right-handed chiral additive R-5011 or 1.7% of the left-handed chiral additive S-5011 with the remainder of the mixture comprising 39.3% w/w UCL-001, 59% w/w UCL-008 photopolymerizable mixtures). Because the preferred alignment has been induced, with two layers each reflecting substantially the opposite handedness of light incident on the sample filter, the chiral nematic liquid crystal exhibits a pronounced dip in transmission of around 0.4% (due to an increase in reflectivity) at approximately 910 nm. Such a filter, prepared according to the invention, would be particularly suitable for laser and electro-optic protection applications, for example. The invention allows the reflective wavelength position, bandwidth and transmission/reflection level to be accurately and precisely controlled to meet a pre-determined threat or optical requirement.

By simply varying the quantity of chiral dopant, reflective notch filters can be effectively created anywhere in the UV, visible and near infra-red parts of the spectrum.

Example 9

Figure 10A:
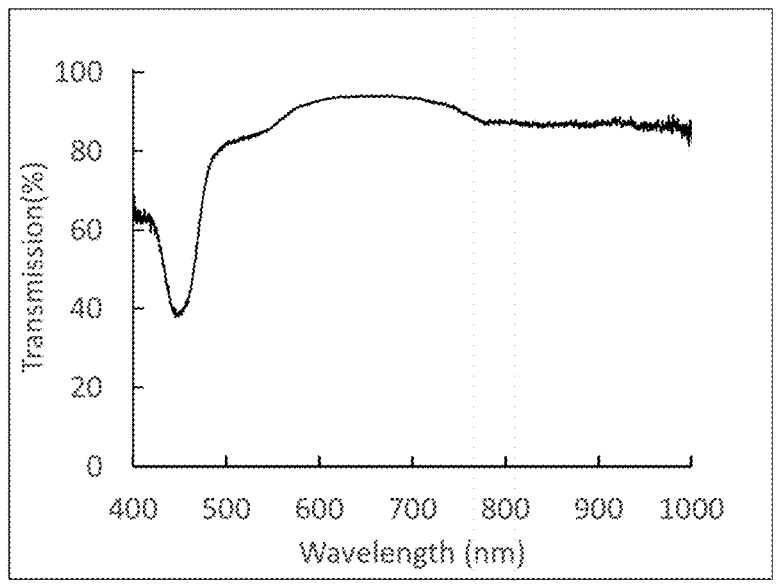
FIG. 10a shows, according to the invention, an aligned liquid crystal layer (comprising the mixture 3.3% w/w of the left-handed chiral additive S-5011, 38.7% w/w UCL-008, 58% UCL-001) creating a reflective filter in the blue portion of the spectrum (approximately 450 nm).

A photopolymerizable mixture containing 3.3% w/w of the left-handed chiral additive S-5011 (Kindchem Ltd), 38.7% w/w UCL-008, 58% UCL-001 was made and allowed to fully mix in the isotropic phase at 110 degrees Celsius with mechanical stirring for 30 minutes. The mixture exhibited the chiral nematic phase at room temperature. A polymerized aligned film of chiral nematic liquid crystal was obtained by following the process described in Example 6. The sample appearance and alignment were substantially uniform across the whole area covered by the liquid crystal material. The preferred alignment of the liquid crystal confirmed by the measurement of selective reflection of light by the sample when viewed at normal incidence (FIG. 10). The sample thickness was approximately 5 microns. The peak reflection—or minimum transmission level—occurred at approximately 450 nm with a bandwidth (FWHM) of approximately 30 nm.

FIG. 10 shows, according to the invention, an aligned liquid crystal layer made from a mixture comprising 3.3% w/w of the left-handed chiral additive S-5011, 38.7% w/w UCL-008, 58% UCL-001. The figure shows a graph of transmission versus wavelength for a material exhibiting a reflection band in the blue part of the visible spectrum, specifically at 450 nm, with a bandwidth of approximately 30 nm and minimum transmission of around 40%. It should be noted that, for a reflective filter, the minimum transmission corresponds to the maximum reflectivity (generally speaking, T+R=1, where T is the fraction of light transmitted and R is the reflectivity)

Example 10—Red Filter

A filter layer was prepared according the process described in Example 6, but with a formulation comprising 2.2% w/w R-5011, 39.7% w/w UCL-008, 58.1% w/w UCL-001.

Figure 10B:
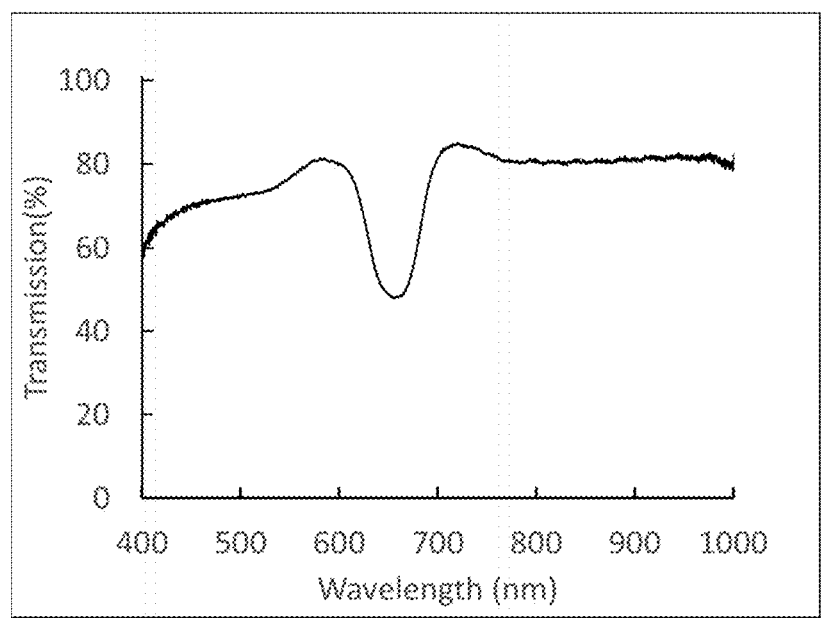
FIG. 10b shows, according to the invention, an aligned liquid crystal layer creating a reflective filter in the red portion of the spectrum.

Following processing, a polymerized LC layer which was substantially uniform and possessing the preferred alignment was obtained. The layer had a reflective notch centre at 658 nm—in the red portion of the spectrum—and a transmission of 51.5% in the notch. The spectrum is shown in FIG. 10b.

Example 11—Green Filter

Figure 10C:
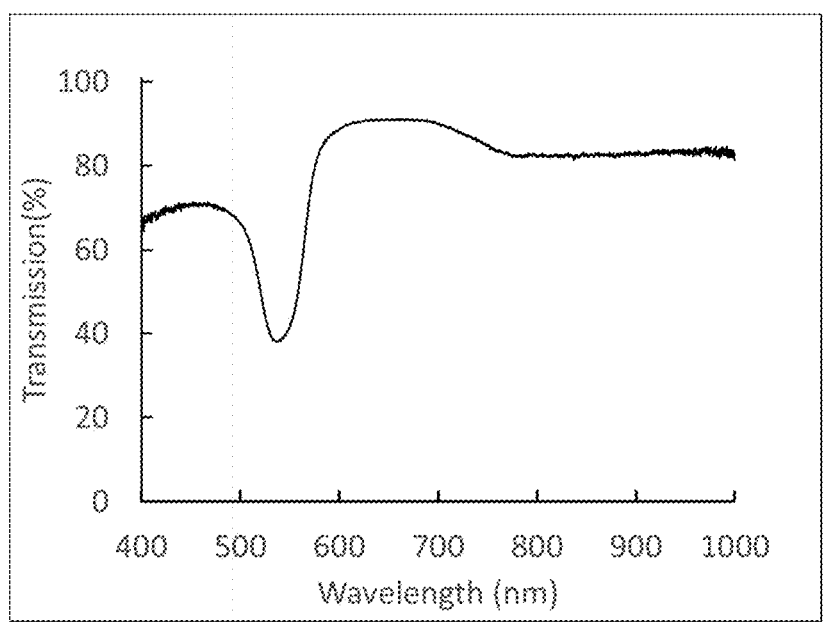
FIG. 10c shows, according to the invention, an aligned liquid crystal layer creating a reflective filter in the green portion of the spectrum.

A filter layer was prepared according the process described in Example 6, apart from the replacement of the PVA coated PET substrates with PET coated with a toner receptive coating but with a formulation comprising 2.7% w/w R-5011, 39.6% w/w UCL-001, 57.7% UCL-008. Following processing, a polymerized LC layer which was substantially uniform and possessing the preferred alignment was obtained. The layer had a reflective notch centre at 550 nm—in the green portion of the spectrum—and a transmission of 45% in the notch. The spectrum is shown in FIG. 10c.

Example 12—Red, Green, Blue Composite Filter

A triple filter layer, comprising three layers reflecting Red, Green and Blue wavelengths respectively, sequentially processed as described in Example 6, using the Red, Green and Blue reflecting notch filters was prepared. The filter was substantially uniform across the whole sample, with the preferred alignment of the polymerised liquid crystal.

Example 13—Augmented Reality Reflective Display Screen

Figure 11A:
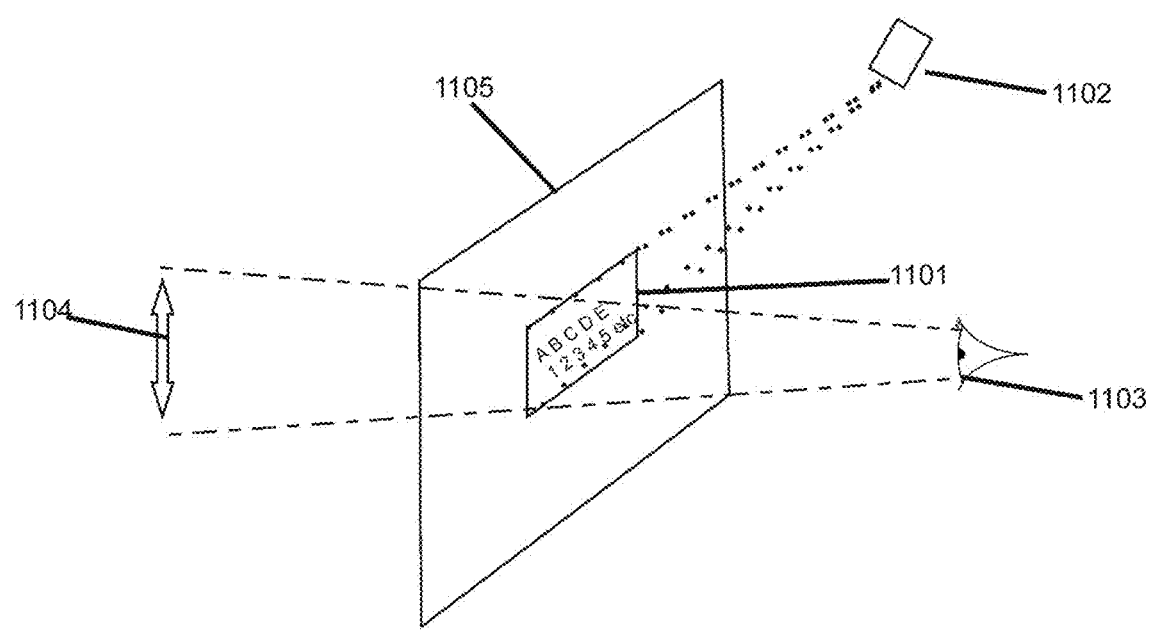
FIG. 11a shows a schematic of how the invention could be applied in an augmented reality application with a reflective filter layer, interposed between a viewer and a physical scene, and prepared according to the invention, reflecting wavelengths substantially matched to the emitted wavelengths from a projector; displaying a high-contrast image which is overlaid, with respect to a viewer, on a physical scene.
Figure 11B:
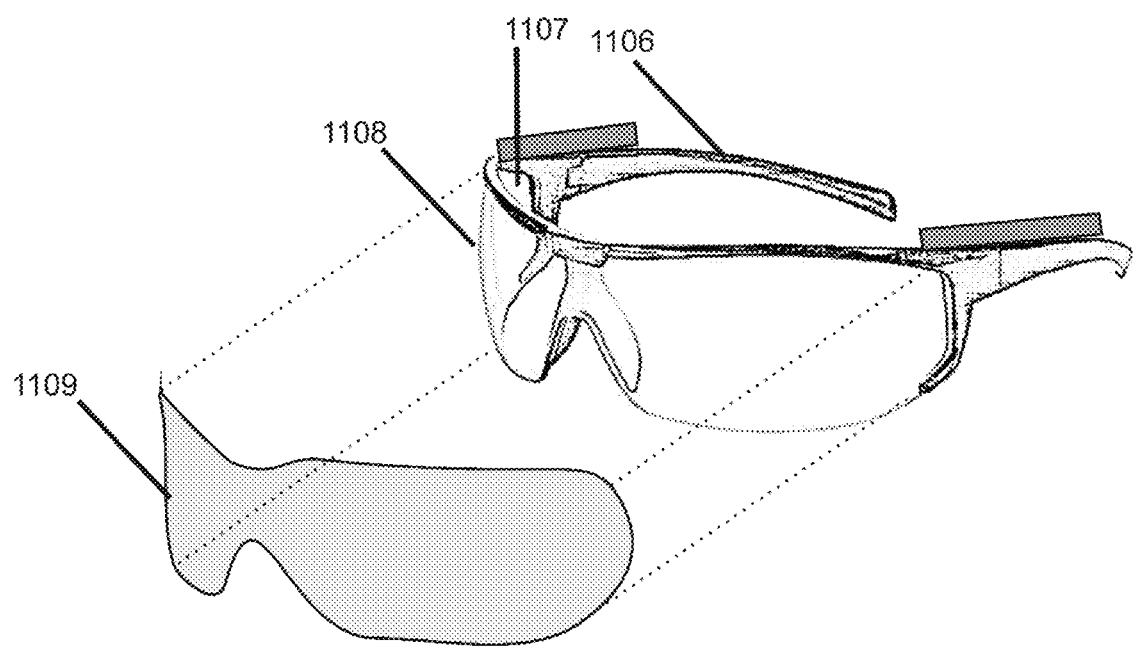
FIG. 11b shows a schematic of use of the invention to create a contrast enhancement filter for head mounted augmented reality display applications.

In order to demonstrate use of the invention as a transparent reflective display screen, including for so called augmented reality displays, an LED projector (LED Pico Pocket Projector, AAXA Technologies) was used to project an image onto a reflective notch filter made by the present invention. A schematic of the arrangement is shown in FIG. 11. This projector consists of a computer controllable display using three color LEDS, comprising Red, Green and Blue emitting LEDs. The emission spectrum was measured and—by way of exemplification—a filter was created to substantially reflect the blue LED emission alone (FIG. 12) whilst substantially allowing relatively high transmission of the remainder of the visible spectrum through the filter. Thus the reflective display screen is tuned to the LED emission allowing greater contrast images, to be projected onto and overlaid on a substantially transparent surface in front of physical scene with respect to a viewer of the scene, than is otherwise possible by projecting onto a standard transparent surface.

FIG. 11 therefore shows a schematic of how the invention is applied in such an augmented reality application. The viewer (1103) observes a physical scene (1104) through a transparent window (1105) onto which is provided a reflective filter layer prepared according to the present invention comprising a chiral nematic liquid crystal with the preferred alignment direction (1101). A projector projects an image onto an area of the transparent window, including at least a part of the reflective filter layer (1101), in which the wavelengths comprising the image projection, are substantially matched to those wavelengths substantially reflected by the reflective layer such that images projected by the projector are substantially reflected to the viewer. The viewer interprets an image on the transparent surface as being overlaid on the physical scene. Other aspects of the system, not shown, would be a means of controlling the projector image, potentially observing the physical scene and creating image content that appears to complement, or otherwise interact in an aesthetic or functional way with the physical scene. It would be obvious to one skilled in the art that this so-called augmented reality depiction could apply to large area displays for retail purposes, or signage, or close to eye applications where the reflective layer, projector and associated components are substantially mounted on the viewers head.

The invention may also be suitable as a contrast enhancement layer, fitted to a head-mounted or otherwise augmented reality vison product or system, in which the layer pre-filters, or preferentially removes to a certain extent, light of substantially specific wavelengths matching those wavelengths used by the system to project an image (for example, wavelengths corresponding to Red, Green, or Blue colours). Typically, the pre-filter layer would be positioned, or attached, at a point between the light incident from the physical scene and the glass, transparent display screen, or waveguide, on to which the overlaid image is projected onto, or otherwise reflecting from, and into the viewers eye (or eyes). Such an approach would help improve the effective contrast of the display in all conditions but especially where the physical scene is bright (E.g. sunlit day). Visibility of augmented reality images in high ambient light conditions can be poor and requires use of tinted or absorbing materials (including variable, electrically controlled dimming devices such as LCDs, electrochromics, for example) to reduce the effective transmission from the physical scene and so improve contrast. This may significantly increase system cost and complexity or diminish the user experience. This use as such a contrast enhancement layer in head-mounted augmented reality applications, for example, is elaborated in FIG. 11b. The head-mounted system, 1106 configured like a pair of eyeglasses for ease of use, support and aesthetics, comprises a means of projecting, or otherwise coupling, images comprising light of certain wavelength ranges into or onto a curved surface 1107 such that from the users perspective compute generated images appear overlaid over a physical scene. The contrast enhancement layer, comprising a filter according to the invention 1109, is positioned forward of 1107 at 1108 (perhaps the first surface, for example) such that substantially the same wavelengths of light corresponding to those used in the projection or computer generated images, are reflected. The effect is to increase the apparent contrast of the image overlaid over a physical scene to improve image quality or clarity, for example.

Figure 12:
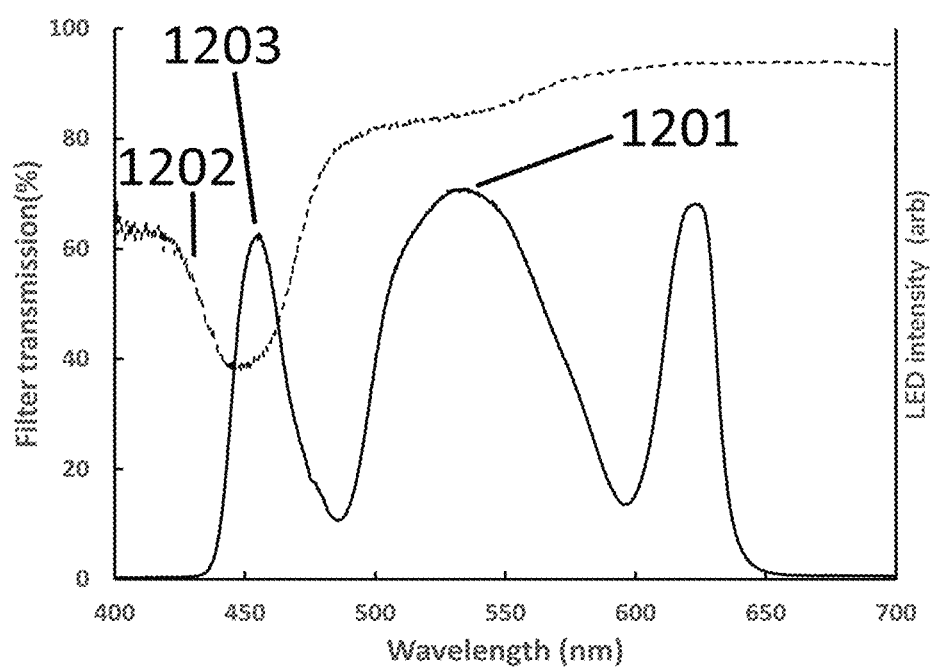
FIG. 12 shows, according to the invention, the spectral positioning and matching of a reflective blue filter layer, prepared according to the invention, to the blue emission wavelength range of a projector.

FIG. 12 shows the approach, according to the invention, of spectral matching of reflective filter layers to the substantial wavelengths emitted by an image projection source. The Figure shows a graph of filter transmission (left hand vertical axis) against wavelength (horizontal axis) for a blue filter (1202); also shown is the emission against wavelength for an RGB pico projector (AAXA) (1201). The blue filter reflects approximately 60% (this is likely to be slightly less due to losses in the plastic substrate) of the light at approximately 450 nm. This substantially coincides with the blue emission of the pico projector resulting in significant reflection of the substantially coinciding wavelengths and a greater contrast image compared to a transparent screen alone without a matched reflective filter. It is obvious to one skilled in the art that similar reflective filters could be designed—with custom bandwidths of the filter—anywhere in the visible spectrum, for example.

In some instances it may be also be preferable to match the circular polarisation of the emitted light (e.g. LED, laser etc.) to the same circular polarisation that would be reflected by the filter.

It will be evident to one skilled in the art that the invention would also allow a composite filter to be created reflecting substantially the Green and Red components of this projector, in addition to the Blue. In which case the reflection bandwidth could also be modified, through altering the liquid crystal birefringence, for example, to substantially match the Green and Red components too.

It is known in the art that cholesteric liquid crystals reflect the same-handedness of polarized light even if that light is incident from opposite directions. A further advantage of the invention with respect to the augmented reality application just described, would be that the reflective filter layer (1101) comprising at least one chiral nematic liquid crystal layer aligned in the preferred direction, would also substantially reflect light wavelengths, due to the selective reflection effect of the chiral nematic liquid crystal, incident from the direction comprising the physical scene. The overall effect therefore would be to further increase the contrast of the image projected onto the reflective surface by substantially removing light of similar wavelengths from the physical scene which would act to reduce the effective contrast of the projected image.

Example 14—Matching the LC Filter to a Specific LED Emission Peak

Figure 13:
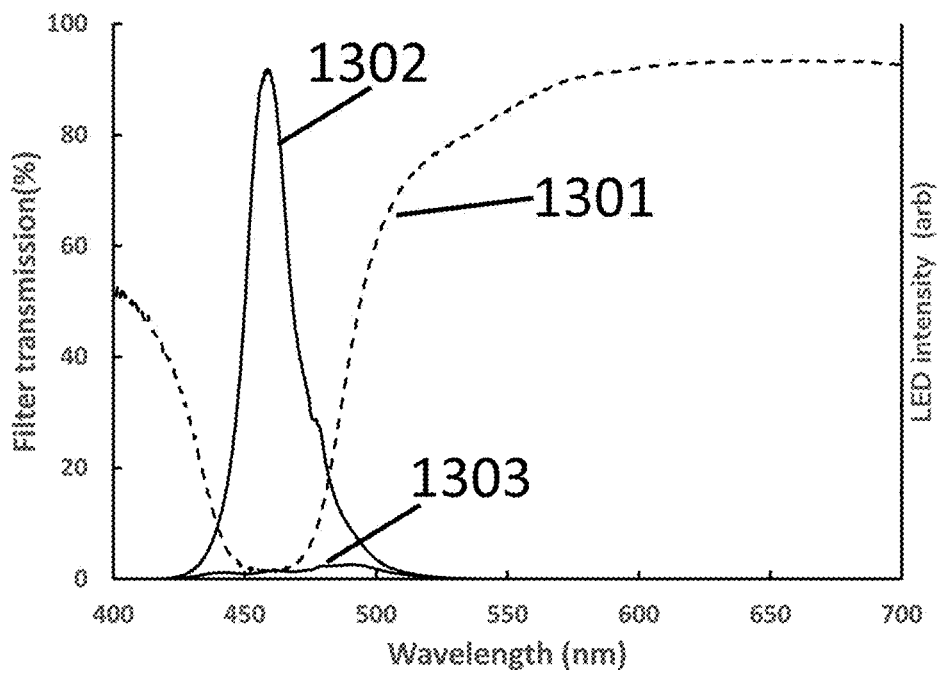
FIG. 13 shows a filter, according to the present invention, comprising four layers of alternating right and left-hand chiral nematic liquid crystals of substantially the same pitch and formulation matched to an LED emitting at a peak wavelength of approximately 455 nm to significantly reduce the transmission of the blue LED.

For many applications, LEDs have become essential as inexpensive light sources for illumination, imaging and fluorescence excitation, for example. In many circumstances it is also desirable to remove the LED contribution to light incident upon a detector. For example, where an LED is used to excite a fluorophore, by removing the LED light emission component, the amount of fluorescence induced can be established in a qualitative or quantitative way. FIG. 13 shows the use of a LC filter, fabricated according to the current invention and designed to match the LED peak emission, to substantially filter out the peak LED emission.

FIG. 13 shows the spectral characteristics of filter (1301), prepared according to the present invention, comprising four layers of alternating right and left-hand chiral nematic liquid crystals of substantially the same pitch and formulation (comprising either 3.3% w/w of S-5011 or R-5011 38.7% w/w UCL-008, 58% UCL-001) matched to an LED emitting at a peak wavelength of approximately 455 nm (1302) before filtering. The subsequent spectral transmission against wavelength following insertion of the filter between the LED source and spectrometer shows a very significant reduction due to the action of the filter (1303).

It is of particular interest to remove the blue LED emission from light sources from a Circadian rhythm perspective. For example, U.S. Pat. No. 9,739,916B2 discloses a polymeric filter in the blue part of the spectrum to reduce the impact on the human body's circadian rhythm via disruption of melatonin production due to excess blue light. The filter disclosed by the current invention would be equally suitable in the same application.

Example 15—Use of LC Filter as an LED Spectrum Modification Element

It is well known in the art that white light emitting LEDs are typically made using a blue-emitting LED to optically excite a coated phosphor which in turn provides broad emission in the remainder of the visible spectrum. The human eye interprets the resulting composite spectrum as white. Such white light LEDs can be characterized in terms of their color temperature—that is the blackbody equivalent emission parameter—measured in degrees kelvin. The greater the emission of the blue LED, relative to the emission by the excited phosphor, dictates a higher color temperature (e.g. 5600 k). It is advantageous to modify the white light spectrum and hence the color temperature in certain applications, including lighting for domestic and industrial needs or for health benefits (perceived or actual).

To exemplify the use of the invention as a means to modify and control white light emission, a filter was prepared according to Example 9, exhibiting a reflective notch at approximately 450 nm. The spectral output from a white light fibre couple LED (Thorlabs MCWHF1, 5600 k color temperature) was measured using an Ocean Optics USB2000 fibre coupled spectrometer. The filter, prepared according to the present invention, was designed to reduce the blue LED emission component, and was inserted between the LED and spectrometer. The filter reduced the intensity of the substantially blue component alone whilst minimizing changes in the rest of the spectral shape. Furthermore, this has reduced the color temperature of the resultant spectrum—giving a so-called 'warmer' color to the human eye. The spectral results are shown in FIG. 14.

Apart from modification of the color temperature, for example, filters could be used to arbitrarily change other aspects of White Light LED emission (or some other similar broadband light source), or to selectively remove specific emission wavelengths or ranges (e.g. specific color LEDs), so as to modify the spectrum in a controlled way whilst leaving the remainder of the spectrum substantially unmodified in terms of spectral profile.

Figure 14:
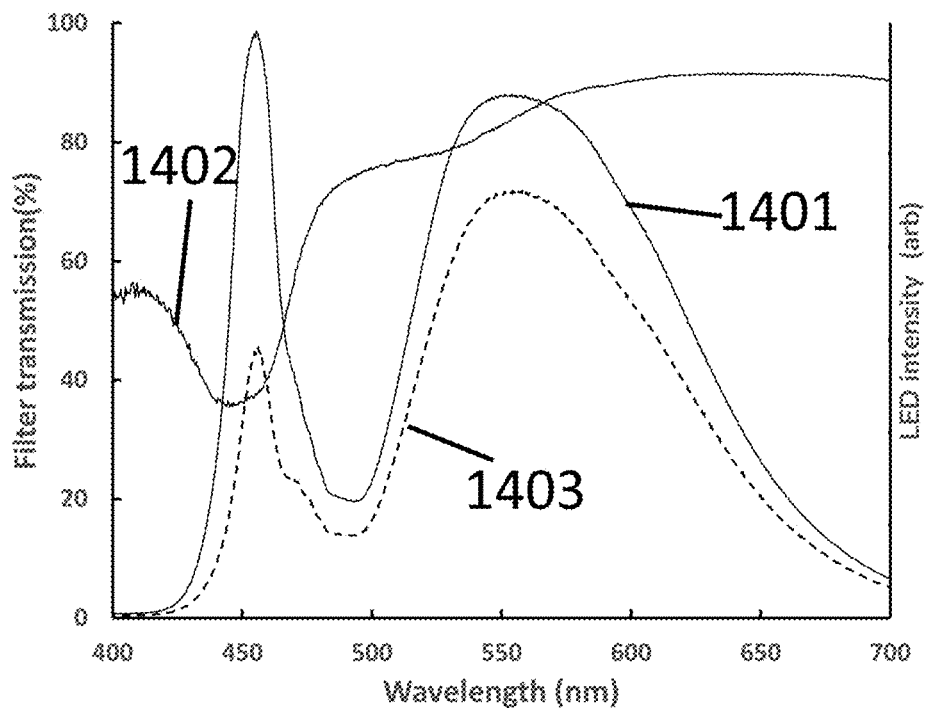
FIG. 14 shows, according to the present invention, the use of a reflective blue filter—prepared according to the present invention—to substantially reduce the relative blue light transmission (at approximately 450 nm) of a white-light emitting LED to change the spectral profile and color temperature of the LED.

FIG. 14 shows, according to the invention, a graph of filter transmission (left hand vertical axis) against wavelength for a single liquid crystal filter layer (1402) made from 3.3% w/w of the left-handed chiral additive S-5011, 38.7% w/w UCL-008, 58% UCL-001 and prepared according to the invention. A plot of the emission against wavelength for a cold white (color temperature 5600 k) LED white light source (Thorlabs MCWHF1 fibre coupled measured using fibre coupled Ocean Optics USB2000 spectrometer) is also shown (1401) without any filtering applied. The reflective blue filter (1402) was then inserted between the LED and Spectrometer resulting in a significant reduction in the emission substantially in the blue part of the spectrum in particular. The reduction in the relative intensity of the blue emission (centred around 450 nm) with respect to the rest of the emission in the visible leads to an effective reduction in the color temperature. The degree of change could be controlled by varying the position, bandwidth and transmission (or reflectivity) of the filter layer prepared according to the invention.

This technique is useful, since the filter could be removed or inserted (according to mechanical force or, for electrically switchable materials, by an applied external electric field) to change the color temperature, or color rendering index, or otherwise light output from an LED installation or luminaire.

Example 16—Creation of a Freestanding Optical Filter Layer

In some applications, it is beneficial that a filter prepared according to the invention is further processed so as to be a freestanding film without an underlying support or base layer. A further example was prepared in the same way as described in Example 8, comprising a 4-layer filter of alternating handedness layers. It was found that the LC filter could be successfully removed by carefully using mechanical means, such as tweezers or scalpel, from the underlying substrate to give a freestanding film (without either original base or top substrates) of approximately 30 microns thickness. This film could be used directly, or further added to other polymer base layers (e.g. polycarbonate, polymethyl methacrylate) with different optical or functional properties.

The invention claimed is:

1. A method of aligning a chiral nematic liquid crystal comprising:
   depositing a first chiral nematic liquid crystal onto a first substrate, wherein the first chiral nematic liquid crystal contains photopolymerisable moieties, wherein a concentration of the photopolymerizable moieties in the first chiral nematic liquid crystal is selected to fix an orientation of a helical axis of the first chiral nematic liquid crystal when photopolymerized;
   positioning a second substrate on top of the liquid crystal to form an initial layer structure;
   applying uniform pressure to at least one of the first or second substrates of the initial layer structure to create a final layer structure in which the first chiral nematic liquid crystal is uniformly aligned with a helical axis perpendicular to a plane of the first substrate; and
   subjecting the final layer structure to at least one of UV or visible light to produce a solid first photopolymerised liquid crystal layer with the helical axis fixed perpendicular to the plane of the first substrate.

2. The method of claim 1, wherein the pressure applied to the at least one of the first or second substrates is applied by a roller across the at least one of the first or second substrates to exert uniform rolling pressure.

3. The method of claim 1, wherein the pressure applied to the at least one of the first or second substrates is applied by passing the initial layer structure between two opposed rollers.

4. The method of claim 3, wherein the two opposed rollers are separated by a gap which is less than a thickness of the initial layer structure.

5. The method of claim 4, wherein a thickness of the first chiral nematic liquid crystal in the final layer structure is in a range of 2 to 9 micrometers.

6. The method of claim 1, further comprising:
   removing one of the first or second substrates, wherein a remaining one of the first or second substrates is a remaining substrate;
   depositing a second chiral nematic liquid crystal onto the first photopolymerised liquid crystal layer;
   positioning an additional substrate on top of the second chiral nematic liquid crystal to form the initial layer structure; and
   applying uniform pressure to at least one of the additional or remaining substrates to create the final layer structure in which the second chiral nematic liquid crystal is uniformly aligned with a helical axis parallel to the helical axis of the first chiral nematic liquid crystal; wherein the second chiral nematic liquid crystal is selected to form a helical structure of a same or opposite handedness of the first chiral nematic liquid crystal.

7. The method of claim 6, wherein the pressure applied to the at least one of the additional or remaining substrates is applied by a roller across the at least one of the additional or remaining substrates to exert uniform rolling pressure.

8. The method of claim 6, wherein the pressure applied to the at least one of the additional or remaining substrates is applied by passing the initial layer structure between two opposed rollers.

9. The method of claim 8, wherein a combined thickness of the first photopolymerised liquid crystal layer and the second chiral nematic liquid crystal in the final layer structure is in a range of 4 to 18 micrometers.

10. The method of claim 6, wherein the second chiral nematic liquid crystal contains photopolymerisable moieties, wherein a concentration of the photopolymerizable moieties in the second chiral nematic liquid crystal is selected to fix an orientation of a helical axis of the second chiral nematic liquid crystal when photopolymerised, wherein the method further comprises:
   subjecting the final layer structure to at least one of UV or visible light to produce a second photopolymerised liquid crystal layer with the helical axis of the second chiral nematic liquid crystal parallel to the helical axis of the first chiral nematic liquid crystal.

11. A method of manufacturing an optical filter, the method comprising the steps of:
   a) depositing a first chiral nematic liquid crystal containing photopolymerisable moieties onto a first substrate;
   b) positioning a second substrate on top of the chiral nematic liquid crystal;
   c) applying uniform rolling pressure to at least one of the first or second substrates to create a layer structure in which the first chiral nematic liquid crystal is aligned with a helical axis perpendicular to a plane of the first substrate;
   d) subjecting the layer structure to at least one of UV or visible light to produce a first photopolymerised liquid crystal layer;
   e) removing one of the substrates to expose a surface of the photopolymerised liquid crystal layer, wherein a remaining one of the first or second substrates is a remaining substrate;
   f) depositing a second chiral nematic liquid crystal selected to form a helical structure containing photopolymerisable moieties onto the exposed surface of the first photopolymerised liquid crystal layer, wherein a handedness of the second chiral nematic liquid crystal is a same or opposite of the first photopolymerised liquid crystal layer;
   g) positioning an additional substrate on top of the second chiral nematic liquid crystal;
   h) applying uniform rolling pressure to at least one of the remaining or additional substrates to create a layer structure in which the second chiral nematic liquid crystal is aligned with a helical axis parallel to a helical axis of the photopolymerised chiral nematic liquid crystal; and i) subjecting the layer structure to at least one of UV or visible light to photopolymerise the second chiral nematic liquid crystal to produce a second photopolymerized liquid crystal layer.

12. The method of claim 11 wherein an inner surface of at least one of the first, second, or additional substrates adjacent to at least one of the first or second chiral nematic liquid crystals is provided with an alignment layer for inducing parallel anchoring of liquid crystal molecules molecules.

13. The method of claim 11, further comprising:
repeating steps e) to i) one or more times.

14. The method of claim 6, wherein at least one of the first or second substrates comprise:
at least one of a polymer or a transparent conductive material.

15. An optical filter formed by the steps of:
depositing a first chiral nematic liquid crystal onto a first substrate, wherein the first chiral nematic liquid crystal contains photopolymerisable moieties, wherein a concentration of the photopolymerizable moieties in the first chiral nematic liquid crystal is selected to fix an orientation of a helical axis of the first chiral nematic liquid crystal when photopolymerized;
positioning a second substrate on top of the first chiral nematic liquid crystal to form an initial layer structure;
applying uniform pressure to at least one of the first substrate or the second substrate of the initial layer structure to create a final layer structure in which the first chiral nematic liquid crystal is uniformly aligned with a helical axis perpendicular to a plane of the first substrate; and
subjecting the final layer structure to at least one of UV or visible light to produce a solid first photopolymerised liquid crystal layer with the helical axis fixed perpendicular to the plane of the first substrate.

16. The optical filter of claim 15, wherein an inner surface of at least one of the first substrate or the second substrate adjacent to the first chiral nematic liquid crystals includes an alignment layer for inducing parallel anchoring of liquid crystal molecules.

17. The optical filter of claim 15, further formed by the steps of:
removing one of the first substrate or the second substrate, wherein a remaining one of the first or the second substrate disposed on the first photopolymerised liquid crystal layer is a remaining substrate;
depositing a second chiral nematic liquid crystal onto the first photopolymerised liquid crystal layer;
positioning an additional substrate on top of the second chiral nematic liquid crystal to form the initial layer structure; and
applying uniform pressure to at least one of the remaining substrate or the additional substrate of the initial layer structure to create the final layer structure in which the second chiral nematic liquid crystal is uniformly aligned with a helical axis parallel to the helical axis of the first chiral nematic liquid crystal, wherein a handedness of the second chiral nematic liquid crystal is at least one of a same or opposite of the first chiral nematic liquid crystal.

18. The optical filter of claim 14, wherein an inner surface of at least one of the first substrate, the second substrate, or the additional substrate adjacent to at least one of the first or second chiral nematic liquid crystals includes an alignment layer for inducing parallel anchoring of liquid crystal molecules.

19. The method of claim 11, wherein the first photopolymerised liquid crystal layer and the second photopolymerised liquid crystal layer are solid films.

20. The optical filter of claim 17, wherein the second chiral nematic liquid crystal contains photopolymerisable moieties, wherein a concentration of the photopolymerizable moieties in the second chiral nematic liquid crystal is selected to fix an orientation of a helical axis of the second chiral nematic liquid crystal when photopolymerized, wherein the optical filter is further formed by the step of:
subjecting the final layer structure to at least one of UV or visible light to produce a second photopolymerised liquid crystal layer with the helical axis of the second chiral nematic liquid crystal parallel to the helical axis of the first chiral nematic liquid crystal.

* * * * *